United States Patent [19]
Lübbe et al.

[11] Patent Number: 5,920,632
[45] Date of Patent: Jul. 6, 1999

[54] APPARATUS FOR CONTINUOUSLY SWITCHING A DEMODULATOR FROM STEREO OPERATION TO MONO OPERATION, AND VICE VERSA

[75] Inventors: Jürgen Lübbe, Jacobneuharting; Peter Kirchlechner, Hohenthann; Jörg Schambacher, München, all of Germany

[73] Assignee: STMicroelectronics, GmbH, Grasbrunn, Germany

[21] Appl. No.: 08/900,608

[22] Filed: Jul. 25, 1997

[30] Foreign Application Priority Data

Jul. 26, 1996 [DE] Germany .................. 196 30 392

[51] Int. Cl.$^6$ ............................... H04H 5/00
[52] U.S. Cl. ..................................... 381/11
[58] Field of Search ............... 381/11, 10, 123, 381/1, 81, 85, 12

[56] References Cited

U.S. PATENT DOCUMENTS

| | | |
|---|---|---|
| 4,032,717 | 6/1977 | Mallon . |
| 4,489,431 | 12/1984 | Ecklund .................. 381/15 |
| 4,703,501 | 10/1987 | Sugai et al. ............... 381/11 |
| 4,817,151 | 3/1989 | Bod et al. ................. 381/11 |
| 4,833,715 | 5/1989 | Sakai ....................... 381/11 |
| 5,155,770 | 10/1992 | Maejima ................... 381/11 |
| 5,432,854 | 7/1995 | Honjo et al. .............. 381/11 |

FOREIGN PATENT DOCUMENTS

| | | |
|---|---|---|
| 41 11 709 | 1/1992 | Germany . |
| 1-186026 | 7/1989 | Japan . |

*Primary Examiner*—Vivian Chang
*Attorney, Agent, or Firm*—David V. Carlson; Seen and Berry LLP

[57] ABSTRACT

In a stereo decoder, channel separation takes place with the aid of a demodulator to acquire signals for stereo operation. At low received field strength there is a continuous switchover to mono operation for each channel in the demodulator. For this purpose a switch is located in a signal path between input and output of the demodulator and driven by a PWM signal whose pulse-width repetition rate determines whether solely mono operation, solely stereo operation or a mixture of the two takes place. For generating the PWM signal, the field strength signal is compared with a triangular signal. To permit the switchover points between stereo and mono operation to be aligned by the manufacturer in accordance with the amplitude of the field strength signal, the apparatus contains two limit storage registers in which digital limit signals are set from outside. These limit signals are converted by a digital-to-analog converter into analog voltages which fix upper and lower limits the triangular signal, thereby determining the behavior of the triangular signal and thus also the pulse-width repetition rate of the PWM signal in accordance with the field strength signal.

20 Claims, 2 Drawing Sheets

5,920,632

APPARATUS FOR CONTINUOUSLY SWITCHING A DEMODULATOR FROM STEREO OPERATION TO MONO OPERATION, AND VICE VERSA

TECHNICAL FIELD

This invention relates to a stereo decoder, but in particular to an apparatus for continuously switching a demodulator in a stereo decoder from stereo operation to mono operation, and vice versa, for which purpose the difference signal of the multiplex stereo signal supplied to an input of the demodulator by an RF section with a variable factor is added to the sum signal of the multiplex stereo signal in order to obtain separate signals for the two channels at two outputs, the factor being realized by a switch located in the signal path between the input and each output and driven by a PWM signal (pulse-width modulated signal) whose pulse-width repetition rate is varied in accordance with a field strength signal, for which purpose this field strength signal is compared with a reference triangular signal whose amplitude varies between an upper and a lower limit.

BACKGROUND OF THE INVENTION

To permit clean stereo reception in a radio, for example a car radio, the field strength of the received signal must be sufficiently great. If the field strength is too low there is acoustically unpleasant interference. Therefore many car radios have a switchover key for switching to mono operation when the reception worsens due to deficient field strength. In mono operation there is no, or at least less, interference. The user of the radio performs the switchover by hand when he feels the reception is too poor. Later he can switch back to see whether good stereo reception is possible again.

One can think of performing the switchover automatically in the device itself rather than manually. For this purpose one can compare the field strength signal acquired in the RF section of the radio e.g. with a threshold in order to switch to stereo operation or mono operation in accordance with the amplitude of the field strength signal.

However, one can also perform this switchover process continuously, likewise in accordance with the amplitude of the field strength signal. In modem motor vehicle radios (and similar devices) the major part of the entire signal processing takes place in a combination of stereo decoder and audio processor. The stereo decoder formed as an integrated circuit is supplied by the RF section the output signal of the IF demodulator, as well as the above-mentioned field strength signal. Elimination of the pilot signal, channel separation, low-pass filtering for damping and the like then take place within the stereo decoder. The audio signal processor formed of stereo decoder and audio processor is furthermore supplied signals from a cassette part or compact disk player possibly present. Also, adjustment of volume, adjustment of treble and bass and the like take place in the audio signal processor.

If one provides in such an audio signal processor a simultaneously integrated circuit which performs continuous switching between stereo operation and mono operation in accordance with a field strength signal, by comparing the field strength signal with a reference triangular signal for forming a PWM signal and having this PWM signal drive high and hold low a signal path between input and output of the demodulator in accordance with its pulse-width repetition rate (ratio of pulse length to interpulse period), an adjustment must be made during assembly of such an audio signal processor in a radio (or, more generally, an audio device) in order to fix the two limits for the variable factor.

The factor varies continuously between the two limits. Above the upper limit there is full stereo operation, and below the lower limit there is solely mono operation.

These limits are set during alignment in the course of the manufacture of the audio device when the audio signal processor formed as an integrated circuit is built in. This alignment is necessary because the amplitude of the field strength signal supplied to the processor during operation is not standardized and can be subject to fluctuations from manufacturer to manufacturer. Alignment ensures that the continuous transition between mono operation and stereo operation actually takes place in optimal fashion, i.e. there is as little interference as possible and at the same time stereo operation takes place as soon as the existing field strength permits.

Hitherto it was usual to wire the chip of the audio processor externally with resistors during the above explained alignment, the manufacturer of the audio device then performing the alignment by means of suitably selected resistance values.

However, wiring an IC chip with external components is not only time-consuming and costly but corresponding connections must also be present on the chip or chip package.

SUMMARY OF THE INVENTION

The invention is based on the problem of providing an apparatus for switching between stereo operation and mono operation in conjunction with a stereo decoder formed as an integrated circuit which permits alignment of the reference triangular signal without the use of external components.

This problem is solved according to the invention in that the stereo decoder has at least one limit storage register into which a digital limit is entered from outside the stereo decoder, being converted into an analog voltage and supplied to a triangular signal generator as a limit.

Two limit storage registers are preferably provided in which an upper and a lower limit for the triangular signal are set digitally.

The invention exploits the fact that the audio signal processor contains inputs for digital signals. An example of such signals is a volume adjusting signal which is supplied to the audio signal processor as a digital signal. Via such inputs one can enter the stated limits into the registers from outside. The digital values stored in the registers are then converted into analog voltages and supplied to the triangular signal generator as limiting voltages.

Such triangular signal generators are known in a great variety of embodiments. A triangular signal is fundamentally generated by a cyclically repeated charging and discharging operation of a capacitor array. The term "triangular signal" here also includes a sawtooth signal or sawtooth-like signal in which a signal peak is flattened out. The smallest and greatest amplitudes of the triangular signal correspond to the lower and upper limits. These limits of the triangular signal determine the time behavior of the triangular signal and thus of the PWM signal acquired with the aid of this triangular signal. In the way known in the art, the PWM signal is formed in that the triangular signal is compared with an essentially constant signal (the field strength signal in the present case) and the intersections between the triangular signal and the constant signal fix the leading edges and trailing edges of the PWM signal. This will be explained more closely below.

Since the acquired PWM signal enables and disables the switch located in the signal path of the demodulator used for signal separation, the share of the difference signal (L−R) added up with the sum signal (L+R) varies. At a very great pulse-width repetition rate corresponding to a very great field strength signal, the stated switch remains closed for a very long time or continuously, so that the factor of the difference signal is great or maximal and stereo operation accordingly takes place. With a weak field strength signal the pulse-width repetition rate of the PWM signal is small and the period of time when the switch is closed is according very short. In the borderline case the switch is constantly open so that only the sum signal of the multiplex stereo signal for mono operation reaches the output of the demodulator.

BRIEF DESCRIPTION OF THE DRAWINGS

In the following an embodiment of the invention will be explained more closely with reference to the drawing, in which.

DETAILED DESCRIPTION OF THE INVENTION

Figure 3:
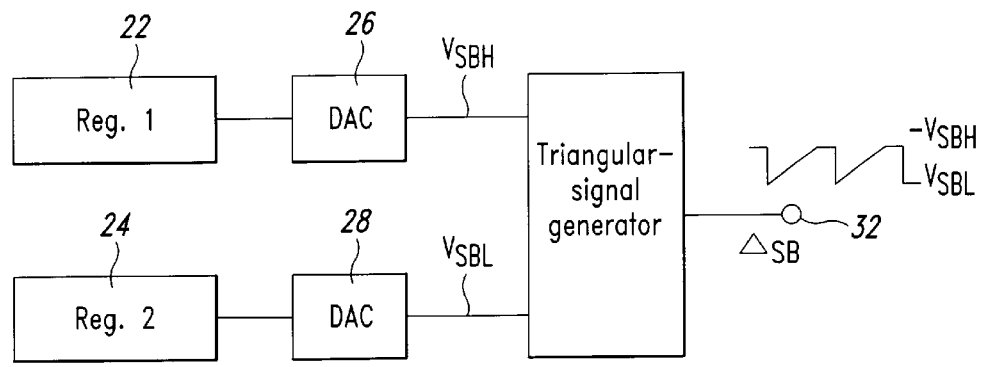
FIG. 3 shows a block diagram of a triangular signal generator with variable limiting voltages.

Before an embodiment of the invention is explained more closely with reference to FIG. 3, the principle of signal processing in demodulation of the signal from the IF demodulator will be briefly explained.

Figure 5:
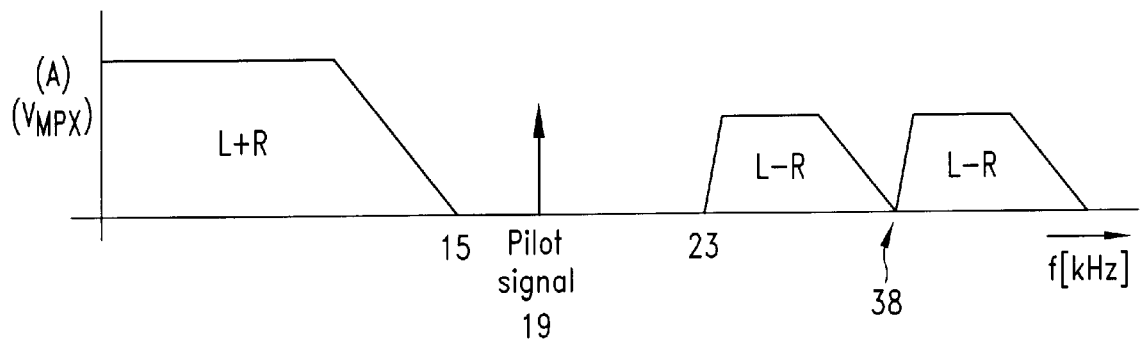
FIG. 5 shows the relevant part of the spectrum of the input signal of the demodulator located in an audio signal processor.

FIG. 5 shows the spectrum of the signal supplied to the demodulator. In the lower frequency range up to 15 kHz there is the sum signal of the multiplex stereo signal, which is designated $V_{MPX}$ here. From the 19 kHz pilot signal the suppressed carrier of 38 kHz can be acquired for demodulating difference signal L−R.

A demodulator to be described briefly in the following acquires the separate signals for the left and right channels according to the following equations:

$$2L = L+R+k(L-R)$$

$$2R = L,+R-k(L-R)$$

where k=0 ... 1.

As one can see, there is strictly mono reception when coefficient k has the value 0. When k=1 there is full stereo reception. At values between 0 and 1 the channel separation becomes weaker the smaller value k becomes.

Figure 1:
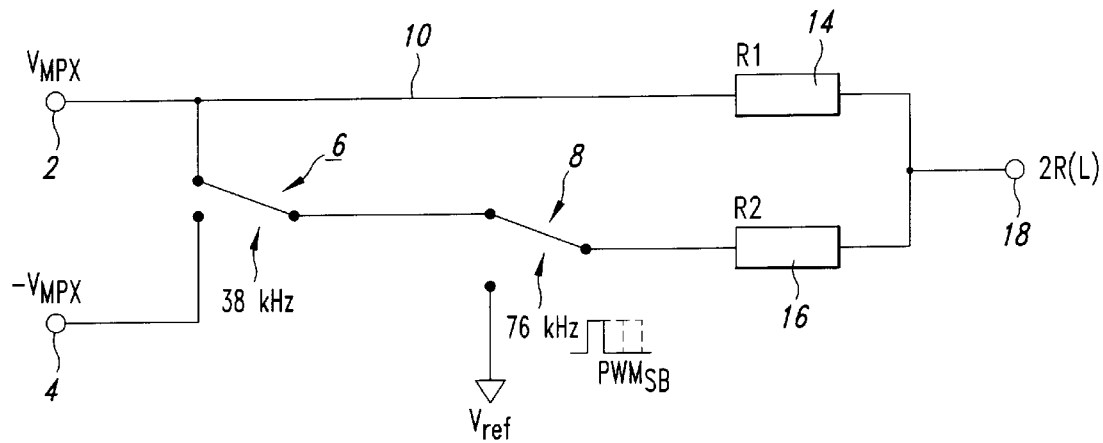
FIG. 1 shows a simplified schematic representation of a part of a demodulator for one of the two channels.

FIG. 1 shows in schematized form for one of the two channels, here the right channel, the demodulator part used for channel separation. Two inputs 2 and 4 are supplied multiplex stereo signal $V_{MPX}$ and $-V_{MPX}$, respectively. Signal $V_{MPX}$ passes continuously via unswitched signal path 10 and resistor 14 (R1) to output 18 of the demodulator part, which also acts as a summing point.

From input 4 signal $-V_{MPX}$ passes via first switch 6 to switched signal path 12. Switch 6 is e.g. a transistor switch and is switched between inputs 2 and 4 at a frequency of 38 kHz (in accordance with the carrier frequency). In switched signal path 12 there is further switch 8 used for continuous switchover between stereo operation and mono operation. Without this switch, difference signal (L−R) would pass via resistor 16 (R2) to output 18. The two resistors 14 and 16 determine the ratio at which the two components (L+R) and (L−R) are added up at output 18.

If switch 8 were continuously closed, one would always obtain at output 18 signal 2R (or signal 2L for the other, left channel not shown in FIG. 1). If switch 8 were continuously open, only the sum signal (L+R) would pass to the output, which corresponds to mono operation, while difference signal (L−R) would be disregarded.

For continuous switchover between mono operation and stereo operation, switch 8 is driven by pulse width signal $PWM_{SB}$ whose pulse-width repetition rate is continuously varied between a minimum and a maximum value in accordance with the received field strength. The minimum value corresponds to a pulse-width repetition rate of "0", i.e. no pulses are present so that switch 8 always remains open. The maximum value corresponds to the maximum pulse width so that switch 8 is virtually always closed.

Figure 2:
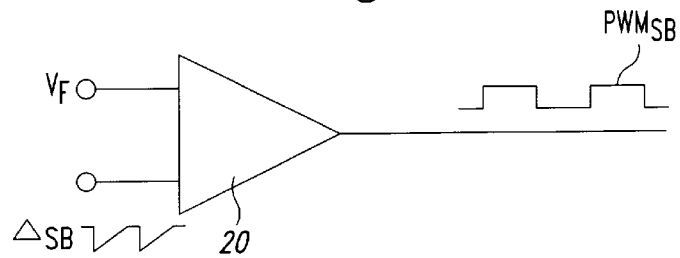
FIG. 2 shows a schematic circuit diagram of a comparator for generating a PWM signal.

FIG. 2 shows schematically comparator 20 for generating signal $PWM_{SB}$ (the index SB stands for the term "stereo blend", i.e. continuous switching between mono operation and stereo operation). Field strength signal $V_F$ is applied to an input of the comparator, triangular signal $\Delta_{SB}$ to the other input.

Figure 4:
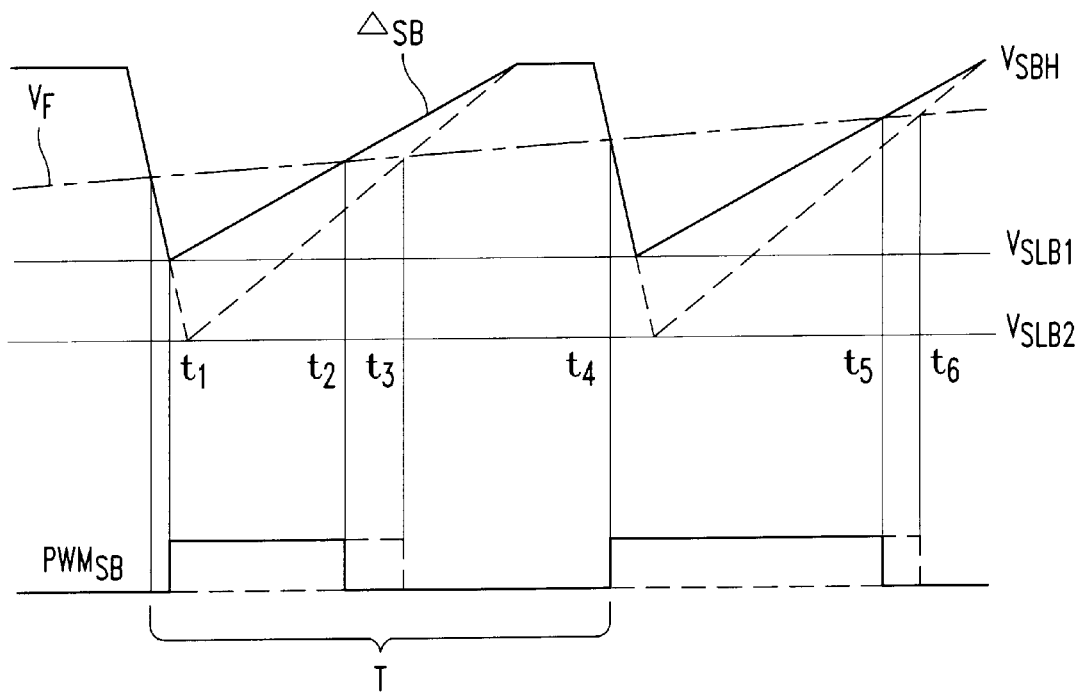
FIG. 4 shows a detailed view of a triangular signal and a PWM signal acquired therefrom.

The generation of the PWM signal is explained more closely in FIG. 4. Field strength signal $V_F$ is shown by a dash-dot line. Triangular signal $\Delta_{SB}$ fluctuates between upper level $V_{SBH}$ and lower level $V_{SBL1}$ or $V_{SBL2}$. The lower level is adjustable here, which is indicated by the two alternative lower limits $V_{SBL1}$ or $V_{SBL2}$. Alternatively or additionally upper limit $V_{SBH}$ can also be adjusted. By varying at least one limit one can influence the time behavior of the triangular signal. If triangular signal $\Delta_{SB}$ intersects field strength signal $V_F$ in the negative direction, as is the case at time t1, comparator 20 according to FIG. 2 delivers a rising pulse. If triangular signal $\Delta_{SB}$ intersects signal $V_F$ in the positive direction, the output signal of the comparator drops from high level to low level. This results in a pulse sequence, and relatively long or relatively short pulses are generated depending on how great the level of signal $V_F$ is.

If one for example reduces the lower threshold of signal $\Delta_{SB}$, the time behavior of the triangular signal varies in such a way that the triangular signal intersects signal $V_F$ at a different time, for example at time $t_3$ here. Therefore PWM signal $PWM_{SB}$ also varies, which is shown by the dashed pulse stretching between times $t_2$ and $t_3$ in FIG. 4. The following pulses of signal $PWM_{SB}$ also vary.

The above explanation thus makes it clear that by varying at least one of the upper and lower voltage thresholds of the triangular signal one varies its time behavior such that it is possible to align the PWM signal, as shown at the bottom of FIG. 4.

FIG. 3 shows a block diagram of triangular signal generator 30 which delivers triangular signal $\Delta_{SB}$ at its output 32. Triangular signal generators can be formed in different ways. In the present context it is important that the shape of the triangular signal is varied by setting upper and lower thresholds $V_{SBH}$, $V_{SBL}$ without influencing the frequency and the phase position of the triangular signal.

Two registers 22 and 24 are provided in FIG. 3 (Reg. 1; Reg. 2). A digital value is entered into each register via a digital input device not shown here, and each digital value is converted from the corresponding register via digital-to-analog converter 26, 28 into an analog voltage signal in accordance with upper threshold $V_{SBH}$ and lower threshold $V_{SBL}$. In triangular signal generator 30 a capacitor circuit is then continuously charged and discharged so as to generate triangular signal $\Delta_{SB}$ obtained at output 32. The above-explained demodulator part shown in FIG. 1, the comparator shown in FIG. 2 and the circuit for generating triangular signal $\Delta_{SB}$ shown in FIG. 3 are formed together with numerous other circuit components on a chip of an integrated circuit. Since the behavior of triangular signal $\Delta_{SB}$ used for adjusting the pulse-width repetition rate of signal $PWM_{SB}$ is varied with the aid of registers 22 and 24 and digital converters 26 and 28, no external wiring with resistors is necessary for alignment of the circuit by the manufacturer of the audio device. One applies a number of voltage levels to the pin of the chip receiving field strength signal $V_F$, and fixes upper and lower limits $V_{SBH}$ and $V_{SBL}$ (or only one of these values) by entering a digital value for register 22 and/or register 24. By selecting a suitable value one can set the PWM signal such that strictly stereo operation takes place above a certain level of field strength signal $V_F$, solely mono operation takes place below a lower level of signal $V_F$, and (therefore) "mixed operation" takes place when signal $V_F$ has a value between the two stated limits.

What is claimed is:

1. An apparatus for continuously switching a demodulator in a stereo decoder from stereo operation to mono operation, and vice versa, for which purpose the difference signal of a multiplex stereo signal supplied to an input of the demodulator by an RF section with a variable factor is added to the sum signal of the multiplex stereo signal in order to obtain separate signals for two channels at two outputs, comprising:

a switch located in each signal path between the input and each output and driven by a PWM signal whose pulse-width repetition rate is varied in accordance with a field strength signal, for which purpose this field strength signal is compared with a reference triangular signal whose amplitude varies between an upper and a lower limit, the stereo decoder having at least one limit storage register into which a digital limit is entered from outside an audio processor that includes the demodulator, the digital limit being converted into an analog voltage and supplied to a triangular signal generator as a limit.

2. The apparatus of claim 1, wherein two limit storage registers are provided for the upper and lower limits, respectively.

3. The circuit according to claim 1, further comprising a digital to analog converter used to transform the digital contents of the storage register to an analog voltage.

4. The apparatus according to claim 1, further including:

a comparator to compare field strength to triangle wave generator output.

5. A circuit for automatically switching a demodulator in a stereo decoder between stereo and mono operation and additionally capable of automatically providing mixed operation comprising:

at least one limit storage register programmable from outside the stereo decoder;

a signal generator capable of providing decreasing and increasing signal levels that is capable of having upper or lower signal amplitude limits programmed by a signal from the contents of the limit storage register; and a means for generating a signal to close or open a stereo/mono switch in a stereo demodulator, the position of the switch and its rate of closure being dependent on the field strength of the received signal relative to at least one programmed threshold stored in the at least one limit storage register.

6. The circuit of claim 5 wherein the signal applied to the signal generator is supplied from a DAC that is programmed by the contents of the storage register.

7. The circuit of claim 5 wherein the means for generating the signal to open and close the stereo/mono switch utilizes a comparison between a field strength signal and signal generator output to generate a signal that has a change of state, the duration of the state change being proportional to the strength of the field.

8. A stereo decoder comprising:

a means for providing a sum signal of the left and right channel;

a means for providing a difference signal of the left and right channel;

a means for summing the sum and difference signals;

a switch in series with the difference signal and the means for summing the signals;

at least one limit storage register programmable from outside the stereo decoder;

a signal generator capable of providing decreasing and increasing signal levels that is capable of having upper or lower signal amplitude limits programmed from the contents of the limit storage register; and a means for generating a signal to close or open a stereo/mono switch in a stereo demodulator, the position of the switch and its rate of closure being dependent on the field strength of the received signal relative to at least one programmed threshold stored in the at least one limit storage register.

9. An integrated circuit comprising:

a substrate;

a means for providing a sum signal of the left and right channel;

a means for providing a difference signal of the left and right channel;

a means for summing the sum and difference signals;

a switch in series with the means for providing a difference signal and the means for summing the signals;

at least one limit storage register programmable from outside the substrate;

a signal generator capable of providing decreasing and increasing signal levels that is capable of having upper or lower signal amplitude limits programmed from the contents of the limit storage register; and a means for generating a signal to close or open a stereo/mono switch in a stereo demodulator, the position of the switch and its rate of closure being dependent on the field strength of the received signal relative to at least one programmed threshold stored in the at least one limit storage register, wherein the sum and difference providing means, the summing means, the switch, the at least one limit storage register, the signal generator and the generating means are all integrated on the substrate.

10. A method for switching a receiver between stereo and mono operation comprising:

determining a field strength of a received signal;

reading at least one upper or lower signal amplitude limit from a storage register that is programmable from outside the receiver;

providing decreasing and increasing signal levels in response to the at least one upper or lower signal amplitude limit; and generating a signal to close or open a stereo/mono switch in a stereo demodulator within the receiver, the position of the switch and its rate of closure depending on the field strength of the received signal relative to the at least one upper or lower signal amplitude limit.

11. The method of claim 10, wherein reading at least one upper or lower signal amplitude limit from a storage register comprises reading an upper limit from the storage register.

12. The method of claim 10, wherein reading at least one upper or lower signal amplitude limit from a storage register comprises reading a lower limit from the storage register.

13. The method of claim 10, further comprising programming, from a controller external to the receiver, at least one upper or lower signal amplitude limit to the storage register.

14. The method of claim 10, wherein reading at least one upper or lower signal amplitude limit from a storage register comprises reading at least one digital value representing at least one upper or lower signal amplitude limit from a digital storage register.

15. The method of claim 14, further comprising:

converted the at least one digital value into an analog voltage; and supplying the analog voltage to a triangular signal generator as a limit.

16. The method of claim 10, wherein generating a signal further comprises:

comparing the field strength with a reference triangular signal whose amplitude varies between an upper and a lower limit to derive a PWM signal having a pulse-width repetition rate that varies in accordance with the field strength; and driving a switch that is coupled between an input to the stereo demodulator and left and right channels in response to the PWM signal.

17. The method of claim 10, wherein reading at least one upper or lower signal amplitude limit from a storage register comprises reading at least one digital value representing at least one upper or lower signal amplitude limit from a digital storage register, and the method further includes:

converted the at least one digital value into an analog voltage;

supplying the analog voltage to a triangular signal generator as at least one of an upper and a lower limit;

comparing the field strength with a reference triangular signal whose amplitude varies between the upper and the lower limit to derive a PWM signal having a pulse-width repetition rate that varies in accordance with the field strength signal; and driving a switch that is coupled between an input to the stereo demodulator and left and right channels in response to the PWM signal.

18. The method of claim 10, further comprising:

decoding a sum signal of the left and right channels of a received signal;

decoding a difference signal of the left and right channels; and summing the sum and difference signals to provide a sum signal, wherein determining a field strength of the received signal includes determining a field strength of the received signal from the sum signal.

19. The method of claim 18, wherein reading at least one upper or lower signal amplitude limit from a storage register comprises:

reading a lower limit from the storage register; and reading an upper limit from the storage register.

20. The method of claim 18, wherein generating a signal comprises determining from the field strength of the received signal both or either of upper and lower switching levels such that above the upper level solely stereo operation takes place and below the lower level solely monophonic operation takes place, and mixed stereophonic and monophonic operation takes place at intermediate levels.

* * * * *